United States Patent
Brown

[11] 3,863,697
[45] Feb. 4, 1975

[54] INSTANT VALVE INSERT

[76] Inventor: Roland Clough Brown, 425 Stratford Ct., Del Mar, Calif. 92014

[22] Filed: Dec. 17, 1973

[21] Appl. No.: 425,238

[52] U.S. Cl. .................. 152/427, 137/223, 137/231, 137/315
[51] Int. Cl. .......................................... B60c 29/00
[58] Field of Search ............ 137/223, 231; 152/415, 152/427, 429

[56] References Cited
UNITED STATES PATENTS

| | | | |
|---|---|---|---|
| 626,582 | 6/1899 | Whisler | 152/429 X |
| 736,025 | 8/1903 | Sampson | 152/429 |
| 1,160,168 | 11/1915 | Henderson | 152/429 |
| 1,232,592 | 7/1917 | Morris | 152/429 |
| 3,311,153 | 3/1967 | Wolfe | 152/429 |
| 3,510,929 | 5/1970 | Kilmarx | 152/427 X |
| 3,511,295 | 5/1970 | Kilmarx | 152/427 |

*Primary Examiner*—Harold W. Weakley

[57] ABSTRACT

Frequently, the valve stem assembly of a tubeless tire is bent away from its valve plug, seated rigidly in the wheel flange, and an incipient crack occurs at the base of the valve stem which later grows and develops a path for a slow leak in the tire requiring valve replacement. The replacement operation now requires the entire removal of the tire in order to remove the valve plug from the wheel flange and the insertion of a new valve stem assembly. This work takes time to accomplish and costs money. Possessed of the instant invention, the vehicle operator simply breaks off the broken valve stem, leaving the valve plug seated in the wheel flange with its center hole, then carefully pushes the nose tip assembly of the replacement valve stem assembly into the center hole until the anchor tees are clear of the center hole and drop crosswise of the center hole preventing removal. The sealing nut is then tightened by hand. It air seals the Instant Valve Insert to the broken off top of the old valve plug, while drawing the anchor tees lightly against the bottom of the old valve plug and air-sealing the nosetip in the new valve stem by means of a rubber washer. The follower nut is then tightened against the lock washer and sealing nut to prevent any loosening of the new Instant Valve Insert. The tubeless tire is then reinflated to the desired tire pressure. The old valve cap and the old valve spring assembly are salvaged as both are reuseable. You are ready to roll once again. The whole job may be done in an instant by the vehicle operator as long as there is a source of compressed air available or a tire pump in a pinch.

5 Claims, 10 Drawing Figures

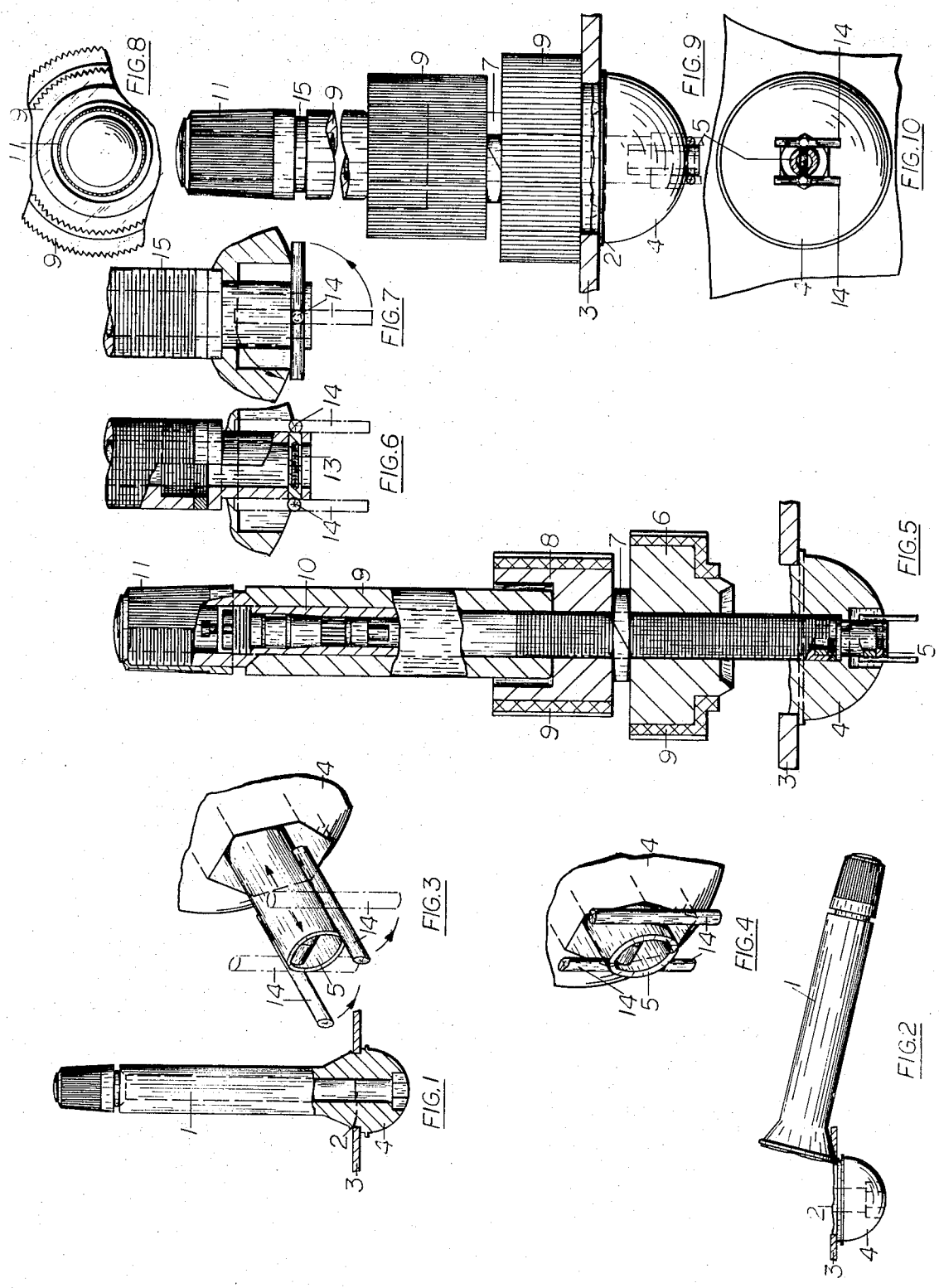

INSTANT VALVE INSERT

The instant invention relates to a new and useful replacement valve stem assembly for tubeless tires, much needed by the motoring public for both pleasure and commercial vehicles, and provides instant replacement for a leaky tire valve at no labor cost or time loss to the vehicle operator.

It is the primary object of the invention to enable the vehicle operator to replace a faulty tire valve instantly from the accessible outside of the tire and wheel flange.

In conjunction with the above object, it is also a significant object of the invention to avoid the necessity of removal of the wheel and dismounting of the tubeless tire from the rim in order to replace a faulty tire valve.

Likewise, another object of the invention results in the savings of time that normally results from the use of the Instant Valve Insert on tubeless tires.

Another important object of the invention is to save the cost of labor required to remove the entire wheel, dismount the tire, remove and discard the broken off valve plug, insert a new valve stem assembly, remount the tire on the rim, inflate it and replace the wheel on the vehicle.

A further object of the invention permits the vehicle operator to carry spare Instant Valve Inserts in the trunk of the vehicle for emergency use. Then, in an emergency, a tire pump, or a compressed air packet, now on sale for emergency use in the case of a flat tire, will serve to reinflate the tire after the insertion on the Instant Valve Insert while on the road.

Again, an important object of the invention is the extreme simplicity of the replacement operation, requiring no training or special tools, even a female vehicle operator can do the job.

Basically, the invention provides for the utilization of an Instant Valve Insert, fitted into the hole in the old valve plug, which is seated firmly in the wheel flange, and held there by the two anchor tees, when they rotate and assume a position crosswise of the hole, through which they entered the tire, and are drawn up tightly against the bottom of the old valve plug top by means of the sealing nut and locked securely there by the lock washer and the follower nut. the old valve stem cap and the valve string assembly are always salvaged as reuseable. The tire is now ready to be reinflated.

Normally, the Instant Valve Insert has its own valve spring assembly and valve cap when supplied. In the event that either are missing or defective, they may be replaced by the salvaged ones from the old valve stem. Thus the chance of failure in an emergency is eliminated.

In addition, The vehicle operator can drive with peace of mind insofar as a flat or soft tire, resulting from a leaky valve stem assembly, is concerned, especially when the spare tire has already been utilized and not yet fixed, or no spare exists, and he is distant from home, garage or filling station.

These, together with other objects and advantages, which will become subsequently apparent reside in the details of assembly and operation as more fully hereinafter described and claimed, reference being made to the accompanying drawing forming a part hereof, wherein like numerals refer to like parts throughout, and in which:

FIG. 1 is a full size side view of a valve stem assembly for tubeless tires, shown with a broken-open section in the base, revealing an incipient crack near the wheel flange into which the valve stem assembly is anchored;

FIG. 2 is a full scale side view of the valve stem assembly for tubeless tires, shown with a crack fully developed and the valve stem toppled over to one side, while the base portion remains anchored in the wheel flange shown in section;

FIG. 3 is a perspective view of the new instant valve insert nosetip assembly, shown fully extended through the hole in the old valve plug with arrows indicating the movement of the nosetip assembly and of the anchor tees in the fully extended position;

FIG. 4 is a perspective view of the new instant valve insert nosetip assembly, shown fully withdrawn into the hole in the old valve plug and the anchor tees in final, crosswise, anchoring position, hard against the old valve plug;

FIG. 5 is an enlarged side view of the replacement valve stem assembly, showing various sections to expose the nosetip assembly at the base in the old valve plug in the wheel flange and with the nosetip assembly beginning to penetrate the interior of the tubeless tire with its anchor tees in position parallel to the length of the valve stem, sealing and follower nuts with lock washer between them, valve spring and valve cap;

FIG. 6 is an enlarged side view in section of the nosetip assembly in position in a broken-off portion of the old valve plug, showing the rubber washer seal against air leaks, nosetip coupling with two anchor tees inserted loosely in bushing holes in the nosetip coupling and held together securely by the stud connector, the top end of the nosetip coupling being threaded for connection to the valve stem;

FIG. 7 is an enlarged end view of the nosetip assembly in position in a broken-off portion in section of the old valve plug with the anchor tee shown with arrows to indicate movement to the anchoring position, shown in phantom, when the nosetip is fully extended into the interior of the tubeless tire;

FIG. 8 is an enlarged top view of the valve cap;

FIG. 9 is an enlarged broken view of the replacement valve stem assembly, showing follower nut, lock washer and sealing nut in final position, clamping the two anchor tees hard against the bottom of the old valve plug, seated in position in the section of the wheel flange;

FIG. 10 is an enlarged bottom view of the nosetip assembly in final position hard against the bottom of the old valve plug, showing end of nosetip coupling, two anchor tees and stud connector.

Referring now specifically to the drawing, in FIGS. 1-10, starting at the left top of the long side of the drawing, there is shown a used valve assembly 1 with an incipient crack 2 at the base, fitted into the vehicle wheel flange 3 hole provided for the old valve plug 4. Again, below the said used valve stem assembly is shown after the said crack has grown until the stem portion of the said valve stem assembly has dropped to the side, leaving the said old valve plug in place in the said wheel flange. Now to the immediate right, in the two perspective views, are shown the said old valve plug and the nosetip coupling 5 with its stud connector 13 and twin anchor tees 14. Then beginning at the bottom end of the enlarged view just to the right, the nosetip coupling is shown in the replacement valve stem assembly half way through the said old valve plug, secure in the said wheel flange of the vehicle, in its penetration to the interior of the tubeless tire, just above is shown the sealing nut 6 in the up position to allow for downward movement of the said nosetip coupling when the said nosetip coupling has penetrated sufficiently far to allow the twin anchor tees to rotate and assume a crosswise position to the said old valve plug after which the said nosetip coupling is retracted as far as it will go, then the said sealing nut is tightened by hand turning until the circular ridge on the bottom side penetrates and squeezes the cracked face on the top side of the said old valve plug while the lock washer 7 follows it downward, urged on by the follower nut 8, which when tightened by hand, securely clamps the whole replacement unit to the said old valve plug in an air-sealed, leakproof, unbreakable combination, while just above are shown the molded rubber coating 9, the valve spring assembly 10 and the valve cap. Next, immediately tight above is shown the side voew of the enlarged said nosetip coupling with the rubber washer 12, said stud connector and said twin anchor tees, and alongside at its immediate right is shown in an end view, the replacement valve stem 15 of the valve stem assembly, called instant valve insert. Next, to the right, beginning at the top is shown enlarged the said valve cap in a top view and, next below, is shown enlarged a side view of a broken said replacement valve stem, showing from the top downward the said valve cap, said replacement valve stem, said molded rubber coating, said follower nut, said lock washer, said sealing nut, end of said nosetip assembly with said twin anchor tees in crosswise position and clamped securely to the said old valve plug by the action of the sealing nut above on the said old valve plug, section of said wheel flange and the said crack. Lastly, just below, at the extreme right bottom of the drawing, is shown an enlarged bottom view of the said old valve plug with the end of the said nosetip coupling in place with its said twin anchor tees and said stud connector.

To assemble the instant valve insert for tubeless tires, the task is divided into two parts as follows: The replacement valve stem and the nosetip assembly. Then these two parts are joined to assemble the replacement valve stem assembly, called instant valve insert. First, the replacement valve stem is threaded inside the top end for the valve spring assembly which is screwed in tightly from the top with the old-fashioned metal type valve cap with its milled slot acting as a screw driver. The old valve spring assembly may be reused from the broken off top of the old valve stem if a new one is not available. The valve cap may then be screwed onto the top of the replacement valve stem so as not to lose it for the moment. From the bottom end of the replacement valve stem, screw on the follower nut with its well up to fit over the rubber molded covering of the replacement valve stem, then slip on the lock washer and follow it by screwing on the sealing nut with its circular ridge on the bottom end. This done, the assembly of the replacement valve stem is complete. Second, the nosetip assembly has a nosetip coupling with threads on the outside of the top end and is drilled clear through with bushing holes for the twin anchor tees near the bottom end of the nosetip coupling. Screw the stud connector into one of the anchor tees in the tapped hole in it. Slide this anchor tee, stud connector end first, into either one of the drilled bushing holes near the bottom end of the nosetip as far as it will go, then slide the other anchor tee into the opposite bushing hole and turn this anchor tee until it screws tightly into the connector stud, leaving the twin anchor tees securely connected together and able to rotate freely in the bushing holes of the nosetip assembly. This final step completes the assembly of the nosetip assembly. Third, place the rubber washer over the threaded end of the nosetip coupling, then screw threaded end of the nosetip coupling with rubber washer in place into the bottom end of the replacement valve stem, forming the completed replacement valve stem assembly, called instant valve insert. The instant valve insert is supplied completely assembled with nosetip assembly, valve spring assembly and valve cap.

To dismantle the instant valve insert, simply reverse the assembly operations.

To install the instant valve insert on a tubeless tire with a leaky valve stem assembly, break off the top stem end of the used valve stem assembly completely, leaving the old valve plug in position in the wheel flange. Salvage the valve cap and the valve spring assembly for possible future use. Take the instant valve insert in your working hand and examine the nosetip end to make sure that the twin anchor tees are in correct position alongside of the nosetip coupling, parallel to the instant valve insert length, and better with the longer ends pointing forward so that they will drop down under the force of gravity as soon as the nosetip has penetrated the old valve plug far enough to permit the shorter ends of the anchor tees to clear the bottom of the old valve plug, when they will assume a crosswise position perpendicular to the length of the instant valve insert, permitting them to act as anchors in the final clamping. Now withdraw the instant valve insert as far as it will return. The anchor tees will limit the withdrawal movement. Grasp the sealing nut by the ridged molded rubber elements of its outer cylindrical surface with the fingers of the working hand and screw down the sealing nut, forcing the circular ridge on its bottom into the old valve plug, squeezing it against the cracked top of the old valve plug, the cylindrical valve stem and the hole in the wheel flange, insuring against any air leak at this point. The rubber washer in between the replacement valve stem and nosetip assemblies seals this joint when these assemblies are clamped between the anchor tees and the sealing nut, further insuring against any air leak. Press the lock washer down on the top of the sealing nut by screwing down the follower nut tight against the lock washer. The instant valve insert is now in place and ready to operate.

To operate the instant valve insert, remove the valve cap. Apply the air under pressure from the source available such as a tire pump, compressed air packet, carried in the trunk of the vehicle, or the air hose at a filling station. When the tire pressure is correct for the load, remove the compressed air source connection to the instant valve insert and replace the valve cap. It is wise to replace the used instant valve insert with a new one for future emergency use. Store it in the trunk of your vehicle.

Complete success depends somewhat upon the care in which the instant valve insert is pushed into the old valve plug. Hence, use care in forcing the nosetip through the hole in the old valve plug so as not to dislodge it from the wheel flange. The best method is to start it in carefully with the anchor tees horizontal and pointed like an index finger when it is pointed at the hole in the valve plug, then work the nosetip assembly into the hole with an easy jacking action, up and down, a bit at a time as the rubber in the old valve plug gives until the full penetration has been accomplished. If the old valve plug begins to loosen in its hole in the wheel flange, reverse the push to a pull force during the jacking action until the old valve plug is reseated, then resume the entry operation and continue it until the necessary penetration is fully accomplished and the twin anchor tees are free to drop to the crosswise position inside the tire casing.

From the foregoing, it will be appreciated that a unique system of quickly replacing a leaky valve stem assembly in tubeless tires has been devised by means of an inexpensive instant valve insert, carried normally in the vehicle trunk for emergency use. All parts are metal, usually brass, to avoid rusting when wet, and generally covered with a molded rubber coating, where shown on the drawing. The new style valve cap is now usually made of molded rubber, but the old style valve cap was made of metal. It was more useful since it had a milled slot in the top that was and still is needed to remove and replace a leaky valve stem assembly.

The foregoing is considered as illustrative only of the principles of the instant invention. Further, since numerous modifications and changes will readily occur to those skilled in the art, it is not desired to limit the invention to the exact fabrication and operation shown on the drawing and described herein, and accordingly, all suitable modifications and equivalents may be resorted to as, for example, fishhook, burred-type anchor rods for the nosetip coupling in place of the anchor tees falling within the scope of the invention as well as an expandable snap-in type valve plug to replace the old valve plug by forcing it into the hole in the wheel flange when the instant valve insert is utilized.

What is claimed is as follows:

1. In combination with an old valve plug as broken off from the old valve stem and remaining in the hole of the wheel flange of a vehicle with a tubeless tire, an instant valve insert, comprising a valve stem with a valve cap and a valve spring assembly, fitted on the said old valve plug in the said hole in the said wheel flange from the outside with air-tight clamping and locking means for securing the said valve insert to the said old valve plug at the opposite end of the said instant valve insert from the said valve cap, and fitted with air-tight anchoring means to assist the said clamping and locking means in securing the said old valve plug in the said hole in the said wheel flange of the said vehicle permanently and rigidly to the said instant valve insert.

2. The combination of claim 1 except that the said clamping and locking means are sealing and follower nuts with a lock washer between them.

3. The combination of claim 1 except that the anchoring means are freely-turning twin anchor tees in the bushings of the nosetip coupling, fitted on the top with a rubber washer and threaded end for connection to the replacement valve stem, arranged perpendicular to the lengthwise axis of the said replacement valve stem and connecting them together with a threaded stud connector.

4. The combination of claim 1 except that the said old valve plug may be omitted and replaced by an expandable rubber nosetip assembly.

5. The combination of claim 3 except that the said freely-turning twin anchor tees and the said threaded stud connector may be omitted and replaced by multiple fishhook, burred type anchor rods.

* * * * *